(12) United States Patent
Kasboske (10) Patent No.: US 6,443,605 B1
(45) Date of Patent: *Sep. 3, 2002

(54) ATTITUDE ADJUSTING STRUCTURE FOR A LIGHTING UNIT

(76) Inventor: George Kasboske, 9040 S. 85th Ave., Hickory Hills, IL (US) 60457

(*) Notice: Subject to any disclaimer, the term of this patent is extended or adjusted under 35 U.S.C. 154(b) by 39 days.

This patent is subject to a terminal disclaimer.

(21) Appl. No.: 09/641,008

(22) Filed: Aug. 17, 2000

Related U.S. Application Data (63) Continuation-in-part of application No. 08/540,930, filed on Oct. 11, 1995, now Pat. No. 6,123,441.

(51) Int. Cl.⁷ .................................................. B60Q 1/26
(52) U.S. Cl. ........................ 362/493; 362/523; 362/549; 362/287; 362/419; 362/543
(58) Field of Search ................................ 362/523, 549, 362/285, 287, 427, 419, 543, 249, 493

(56) References Cited

U.S. PATENT DOCUMENTS 6,123,441 A * 9/2000 Kaboske ..................... 362/549

* cited by examiner

Primary Examiner—Sandra O'Shea
Assistant Examiner—Guiyoung Lee
(74) Attorney, Agent, or Firm—Wood, Phillips, Katz, Clark & Mortimer (57) ABSTRACT

The combination of a case having a wall defining a light chamber and an adjusting subassembly for the case for connection between the case and a surface upon which the case is supported. The adjusting subassembly has a first cam element with a first cam surface and a second cam element with a second cam surface. The first and second cam surfaces are abuttable to each other and slidable one against the other so that the first and second cam elements are thereby relatively movable between first and second relative positions. First and second cam elements in the first relative position cause the case to be a first attitude relative to a surface upon which the case is supported. The first and second cam elements in the second relative position cause the case to be in a second attitude relative to a surface upon which the case is supported, with the second attitude being different than the first attitude.

35 Claims, 8 Drawing Sheets

ATTITUDE ADJUSTING STRUCTURE FOR A LIGHTING UNIT

CROSS-REFERENCE

This application is a continuation-in-part of my application Ser. No. 08/540,930 filed Oct. 11, 1995, now U.S. Pat. No. 6,123,441 issued Sep. 26, 2001 entitled "Modular Lighting Unit".

BACKGROUND OF THE INVENTION

1. Field of the Invention

This invention relates to lighting equipment, such as that suitable for use on on- and off-road vehicles to serve as at least one of a headlight, turn signal, tail light, running light, brake light, etc. on the vehicle and, more particularly, to structure for adjusting the attitude of the lighting equipment relative to a surface upon which the lighting equipment is supported.

2. Background Art

It is known to place several different types of lights on on- and off-road vehicles. On the top of truck cabs, running lights and spot lights are commonly seen. This latter type of light is commonly mounted upon a bracket that spans laterally across the top of the vehicle cab. A plurality of lights are mounted in spaced relationship and project upwardly from the bracket. The individual lights, which may be relatively heavy, are held in place principally by a depending stem that acts as a pedestal. It may be difficult with such a construction to maintain the lights in a stable position and in proper alignment. With these lights on off-road vehicles, vibrations and shock induced from riding over rough terrain often tend to work the lights loose from their mounting. Even if the lights do not work loose, there is a tendency of the lights to rattle as they flex about the pedestal-type mount.

In some constructions, if a light becomes misaligned, it must be removed to allow the mounting stem to be reshaped. The light must then be remounted.

In one construction, a light case is pivotable relative to a bracket. One or more bolts are tightened to fix the relative positions of the case and bracket. Predictable, fine adjustments may be difficult to make and maintain.

SUMMARY OF THE INVENTION

In one form, the invention is directed to the combination of a case having a wall defining a light chamber and an adjusting subassembly for the case for connection between the case and a surface upon which the case is supported. The adjusting subassembly has a first cam element with a first cam surface and a second cam element with a second cam surface. The first and second cam surfaces are abuttable to each other and slidable one against the other so that the first and second cam elements are thereby relatively movable between first and second relative positions. The first and second cam elements in the first relative position cause the case to be a first attitude relative to a surface upon which the case is supported. The first and second cam elements in the second relative position cause the case to be in a second attitude relative to a surface upon which the case is supported, with the second attitude being different than the first attitude.

The combination may further include a mounting base on the case, with the adjusting subassembly acting between the mounting base and a surface upon which the case is supported.

In one form, the base is releasably attachable to the case.

In one form, the first cam surface is substantially flat and resides substantially within a single plane. The second cam surface may likewise be substantially flat and reside substantially within a single plane.

In one form, the combination includes a spring acting between the adjusting subassembly and a surface upon which the case is supported, with the spring developing a force that urges the first and second cam surfaces against each other.

The combination may further include a mounting element for mounting the adjusting subassembly on the case.

The mounting element may be a bolt that extends through both of the first and second cam elements.

In one form, the bolt has a lengthwise axis and the first and second cam elements are movable between the first and second relative positions by rotation of at least one of the first and second cam elements relative to the other of the first and second cam elements around the lengthwise axis of the bolt.

The bolt may be repositionable between a loosened state and a tightened state and in the tightened state the bolt draws the first and second cam element surfaces against each other to thereby maintain the first and second cam elements in a desired relative position.

The first and second cam elements may be pivotable relative to each other and the case around an axis.

In one form, each of the first and second cam elements has an annular outer surface.

The combination may further include a light source on the case for projecting light from the light chamber.

The combination may further include a lens on the case through which light from the light source projects.

The combination may further include a reflector for redirecting light from the light source for projection through the lens.

In one form, there is a first keying element on the first cam surface and a second keying element on the second cam surface, with the first and second keying elements abutting to each other to limit sliding movement of the first and second cam surfaces against each other.

In one form, the first and second cam elements are movable between the first and second relative positions by relative rotation of the first and second cam elements around an axis. The first keying element has an elongate rib with a length extending radially with respect to the axis.

In one form, the first and second cam elements,are movable between the first and second relative positions by relative rotation of the first and second cam elements around an axis. There is an elongate rib on the first cam surface having a length extending radially with respect to the axis and a plurality of elongate ribs on the second cam surface each having a length extending radially with respect to the axis, with there being a recess between adjacent ribs on the second cam surface. The rib on the first cam surface resides in a first recess between two ribs on the second cam surface with the first and second cam elements in the first relative position. The rib on the first cam surface resides in a second recess between two ribs on the second cam surface with the first and second cam elements in the second relative position.

In one form, the first rib resides in a third recess between two ribs on the second cam surface with the first and second cam elements in a third relative position.

In one form, the first cam element has a third surface, the case has a fourth surface which abuts to the third surface, and the third and fourth surfaces are slidable one against the other to allow the first cam element to be repositioned relative to the case. There is a first keying element on the third surface and a second keying element on the fourth surface., with the first and second keying elements abutting to each other to limit relative repositioning of the first cam element relative to the case.

The case and first cam element may be guided in movement relative to each other around an axis, with one of the first and second keying elements having an elongate rib with a length extending radially with respect to the axis.

In one form, the other of the first and second keying elements has an elongate rib with a length extending radially with respect to the axis.

In one form, the first cam element has a third surface, the mounting base has a fourth surface which abuts to the third surface, and the third and fourth surfaces are slidable one against the other to allow the first cam element to reposition relative to the mounting base. There is a first keying element on the third surface and a second keying element on the fourth surface, with the first and second keying elements abutting each other to limit relative repositioning of the first cam element and the mounting base.

The invention further contemplates an attitude adjusting subassembly for a lighting unit, with the attitude adjusting subassembly having the construction as described above.

The invention is also directed to an attitude adjusting subassembly for a first element. The adjusting subassembly has a first cam element with a first cam surface and a second cam element with a second cam surface. The first and second cam surfaces are abuttable to each other and slidable one against the other so that the first and second cam elements are thereby relatively movable between first and second relative positions. The first and second cam elements in the first relative position cause the first element to be at a first attitude relative to a surface upon which the first element is supported. The first and second cam elements in the second relative position cause the first element to be in a second attitude relative to a surface upon which the first element is supported. The invention is not limited to the use of two elements, or two positions. In addition, multiple elements may be used to increase or facilitate the angle adjustments of the light source, and/or light sources.

DETAILED DESCRIPTION OF THE DRAWINGS

In FIGS. 1–12, a modular lighting unit, according to the present invention, is shown at 10. The lighting unit 10 has a case 12 with a peripheral wall 14 extending around a light chamber 16 within which a light source 18 (FIG. 8) resides. Light from the source 18 projects forwardly through a striped lens 20 at the forward portion of the case 12. A suitable construction for the lens 20 is described in my U.S. Pat. No. 4,586,116. However, it is not necessary that the lens 20 be other than clear or translucent. In fact, the lens 20 could be altogether eliminated.

Figure 8:
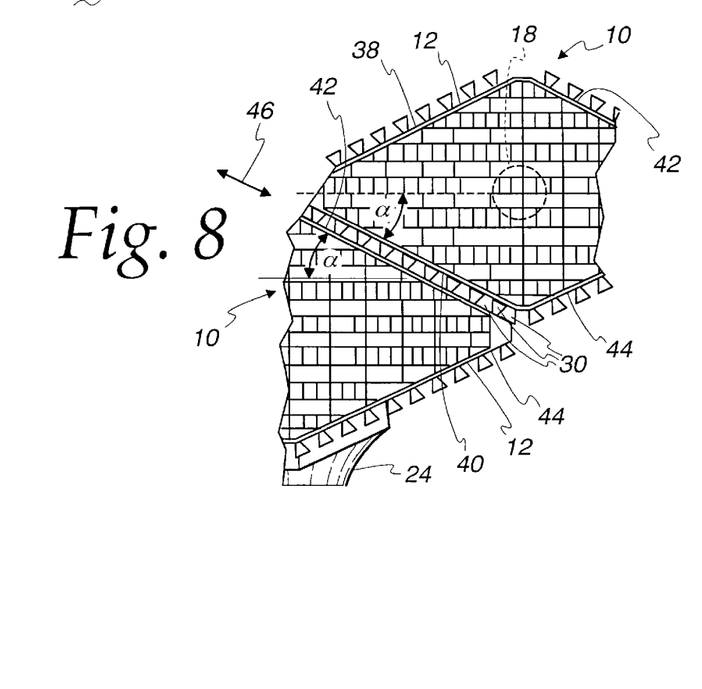
FIG. 8 is an enlarged, fragmentary, front elevation view of the connection between two of the modular lighting units.

Light projecting rearwardly from the light source 18 is redirected forwardly by a reflector 22 at the rear of the case 12. The reflector 22 is likewise optional. The light pattern is centered on a fore-and-aft line 23 extending through the light source 18.

A mounting base 24 defines a cradle at 26 for the bottom 28 of the module 10. The mounting base 24 provides a pedestal/foundation for the module 10 upon a support, as shown generically at 29 in FIGS. 6 and 7.

The case 12 has peripherally spaced, elongate ribs 30 extending in a fore and aft direction, with there being recesses 32 defined between adjacent ribs 30. Each rib 30 has oppositely facing side surfaces 34, 36 which diverge away from the case 12. The recesses 32 have a complementary shape to accept a rib on a like module 10. The ribs 30 and recesses 32 are spaced equidistantly so as to mesh with ribs 30 and recesses 32 on an adjoining, like module 10 in a plurality of different relative positions.

The wall 14 on each case 12 has four flat surface portions 38, 40, 42 and 44 which can be flushly abutted to any of the flat surfaces 38, 40, 42, 44 on a like module 10 to be joined thereto. In one preferred form, the surfaces 38, 40, 42, 44 cooperatively define a diamond shape.

While the peripheral wall 14 could have other shapes, it is desirable that at least one of the flat surfaces 38, 40, 42, 44 extends other than fully vertically or horizontally to facilitate connection to another module 10. As seen most clearly in FIG. 8, the angle α of the surface 42 on the lower module 10 is chosen to be equal to the angle α of the surface 40 on the superjacent module 10 so that with the modules 10 stacked as shown in FIG. 8, the two modules 10 have the same orientation, i.e with one upright, the other module attached thereto is upright. As a result, the upper module 10 is held in cantilever fashion from the wall surface 42 on the lower module 10 through the meshing ribs 30. Since the ribs 30 are spaced equidistantly along the surfaces 40, 42, the two modules 10 can be connected in a plurality of different positions along the line of the double-headed arrow 46.

The arrangement of the ribs 30 and recesses 32 is such that the modules 10 that are to be joined can be relatively positioned, one in front of the other, and moved towards and against each other in a fore and aft direction to mesh the ribs 30. Once the ribs 30 on adjacent modules 10 are in mesh, a screw or other type of wedge 48 (FIG. 12) can be directed into a bore 50 extending lengthwise into or through one of the ribs 30 to progressively effect a lateral expansion thereof, as indicated by the bowed side surface 34 shown in phantom lines in FIG. 12. This effectively locks adjacent ribs 30 on the joined modules 10 to prevent inadvertent separation of the joined modules 10.

Figure 6:
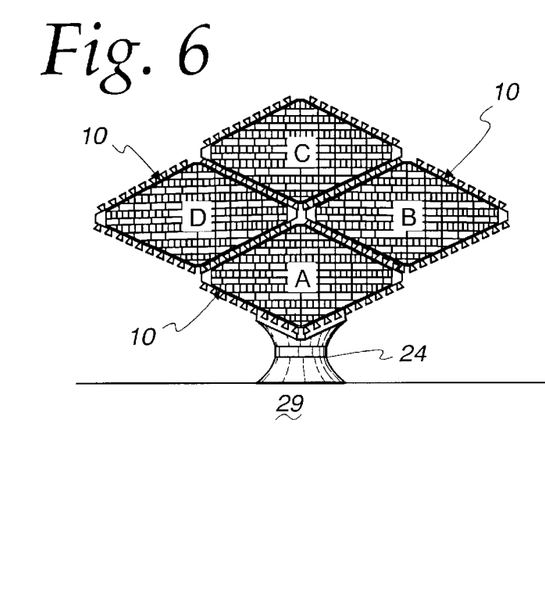
FIG. 6 is a front elevation view of four modular lighting units assembled in one configuration around a single mounting base.

With the above described structure, the modules 10 can be rigidly meshed in clusters in a variety of different attractive and functional shapes. In FIG. 6, four modules, designated A, B, C and D, are shown assembled together to define a larger diamond shape. The module A is carried on a mounting base 24 and connected to modules B and D. The uppermost module C is connected to both the modules B and D. This structure affords a self-rigidifying arrangement by reason of the interlocking of the modules A, B, C and D. Additional modules can be stacked upon the modules B, C, D and each other to construct a further desired shape.

Figure 7:
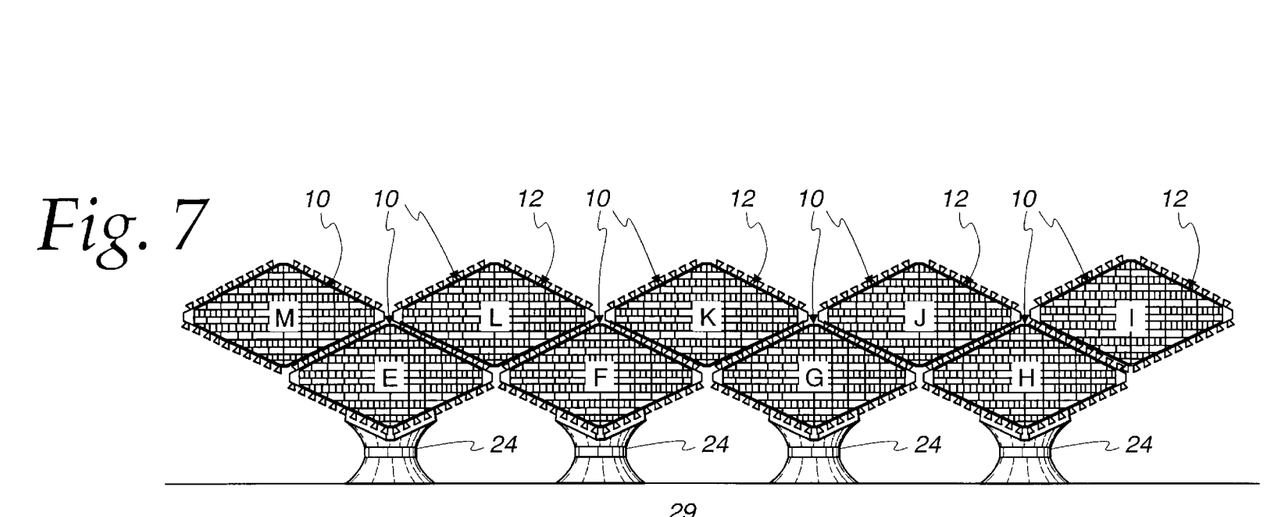
FIG. 7 is a front elevation view showing nine modular lighting units connected together in another configuration on a plurality of mounting bases.
Figure 9:
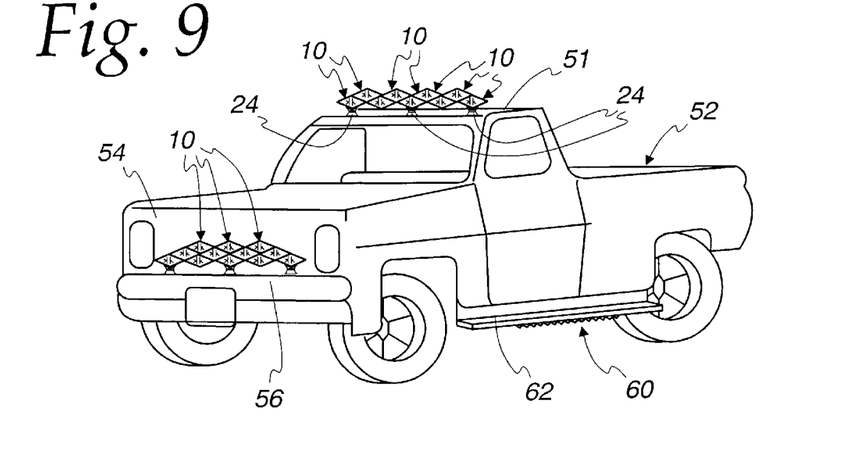
FIG. 9 is a perspective view of one type of vehicle with modular lighting units according to the present invention mounted thereon.

In FIG. 7, nine modules are shown, lettered E–M, arranged in a different configuration. The lowermost modules E, F, G and H are each received in a mounting base 24 which mounting bases 24 are fixed to an underlying support 29. The end modules M, I are each supported in cantilever fashion from a single module E, H, respectively. The other modules L, K, J are each connected to two modules. This interlocking arrangement permits a reinforced, sturdy assembly of modules 10 across a substantial width, as upon the cab 51 of a pickup truck 52, shown in FIG. 9. The support 29 can be the vehicle 52 itself or a bracket which is attached to the vehicle 52. In FIG. 9, the mounting bases 24 are attached directly to the vehicle 52.

A similar arrangement of modules 10 is shown in front of the grill 54 on the front of the vehicle 52 on the bumper 56. The modules 10 are stacked one layer higher than the arrangement shown in FIG. 7.

Figures 10, 11, 12:
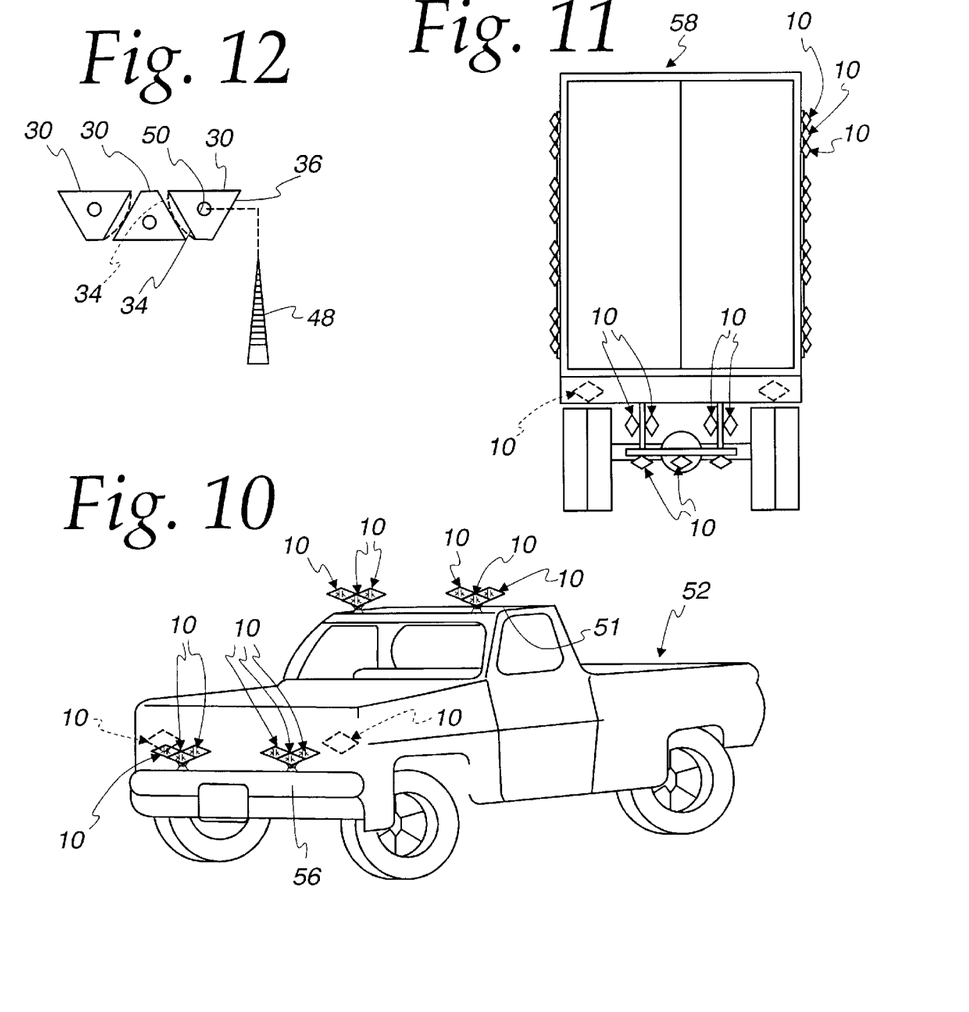
FIG. 10 is a view as in FIG. 9 with the modular lighting units mounted on the vehicle in a different configuration.
FIG. 11 is a rear elevation view of a semi-truck/trailer with modular lighting units thereon.
FIG. 12 is an enlarged, fragmentary, front elevation view of a plurality of ribs and recesses on joined modular lighting units.

In FIG. 10, individual clusters of three are shown mounted upon the cab 51 and bumper 56 on the vehicle 52.

The joined modules 10 can be downsized and used as running lights, as on a semi-truck/trailer, shown at 58 in FIG. 11. In FIG. 11, the single modules 10 are shown to be used as brake and turn signal lights for the semi-truck/trailer 58.

A further downsized version of the module 10 is shown at 60 in FIG. 9 along the edge of a running board 62 on the vehicle 52.

The modules 10 can be simply joined like building blocks to produce an overall desired size and shape. The angular arrangement of the surfaces 38, 40, 42, 44 facilitates stacking, provides a rigid cantilevered support between adjacent modules 10, provides a rigid connection between two joined modules, and allows unique shapes to be created at the point of use by a consumer.

Further, the consumer can disassemble and re-assemble the modules 10 in a desired shape.

The ribbed arrangement of the case 12 also facilitates connection of the case 12 to the mounting base 24. The mounting base 24 is generally L-shaped with a vertically extending wall 64 and a horizontally extending wall 66. The wall 66 has ribs 68 and recesses 70 corresponding to the ribs 30 and recesses 32 in terms of size and spacing. The horizontal wall 66 has a V shape corresponding to the bottom wall of the case 12. The module 10 can thus be press fit from front to rear into operative engagement with the mounting base 24. In that operative position, the rear wall 72 of the case resides in close proximity to the vertically extending wall 64 on the mounting base 24.

The mounting base 24 has an undercut 74 to accept a mounting plate 76 having ribs 78 which can be slid vertically into mesh with ribs (not shown) on the rear wall 72 of the case 12. A fastener, in the form of a screw 80, can be directed through the wall 64, the plate 76 and into the case rear wall 72 to prevent separation of the module 10 from the mounting base 24. Disassembly of the module 10 from the mounting base 24 can be accomplished by reversing the above steps.

A further aspect of the invention, as seen in FIGS. 1, 2 and 13–17, is the provision of an attitude adjusting subassembly at 82, by which the attitude of the combined module 10 and mounting base 24 can be altered relative to the support 29 on which they are carried. First and second sloped disks/cam elements 84, 86 are placed in overlying relationship. In one relative position, the disks/cam elements 84, 86 cooperatively define a uniform thickness. By relatively rotating the disks/cam elements 84, 86, as indicated by the arrow 88, the thickened and thin portions of the disks/cam elements 84, 86 reside in different relationships, thereby causing the upper surface 90 of the disk/cam element 84, which bears on the mounting base 24, to vary in attitude. A mounting bolt 92, which may be any conventional threaded element, can be directed through the disks/cam elements 84, 86 and into the mounting base 24 to fix the relative positions thereof.

An optional spring 94 can be used to biasably capture the disks 84, 86 against the mounting base 24 so that the relative positions of the disks 84, 86 and mounting base 24 are frictionally maintained before the bolt 92 is tightened to positively fix this relationship.

More particularly, the disks/cam elements 84, 86 can have the same configuration. Exemplary disk/cam element 84 has an annular outer surface 96. The disk/cam element 90 has a cam surface 98 that is flat and resides substantially in a single plane. A through bore 100 is centered within the annular outer surface 96 and has a central axis 101. The disk/cam element 86 has a corresponding annular outer surface 102, a flat cam surface 104, and a through bore 106 through which the axis 101 extends.

Figure 13:
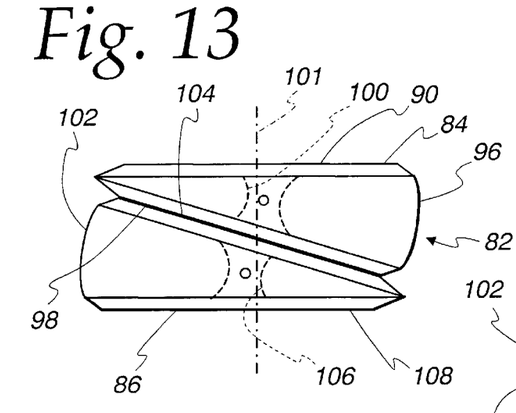
FIG. 13 is a side elevation view of the cooperating disk/cam elements on the attitude adjusting subassembly shown in FIG. 1 with the disk/cam elements in a first relative position.
Figure 14:
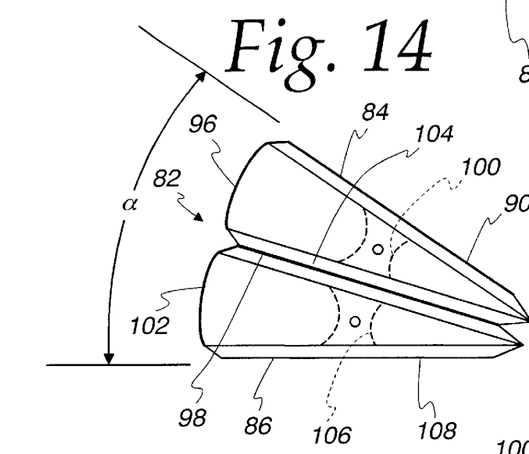
FIG. 14 is a view as in FIG. 13 with the cam elements in a second relative position.
Figure 15:
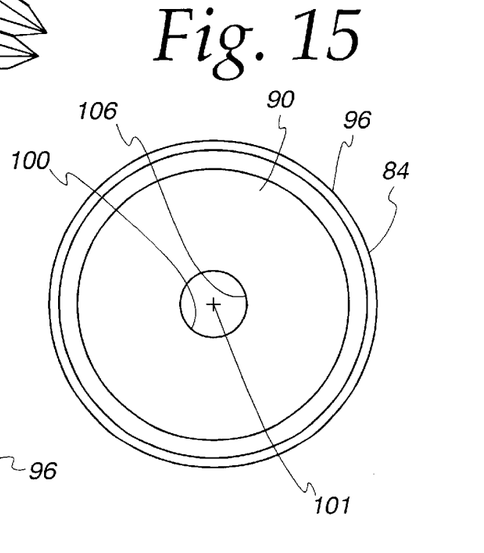
FIG. 15 is a plan view of the disk/cam elements in the FIG. 13 position.

The disks/cam elements 84, 86 are operatively engaged by abutting the cam surfaces 98, 104. In a first relative position, as shown in FIG. 13, the upper surface 90 on the disk/cam element 84, and an oppositely facing surface 108 on the disk/cam element 86 are in substantially parallel relationship. By relatively rotating the disks/cam elements 84, 86 around the axis 101, that extends through both through bores 100, 106, the surfaces 90, 108 reorient and make an angle α with respect to each other. In one extreme relative position, as shown in FIG. 14, the surfaces 90, 108 make an angle a with respect to each other. In between the relative positions for the disks/cam elements 84, 86, shown in FIGS. 13, 14 is a range of relative positions that permit fine attitude adjustment.

It can be seen that with the disks/cam elements 84, 86 acting between the mounting base 24 and a support surface 34, relative rotation of the disks/cam elements 84, 86 varies the angular position of the case 12 relative to the support surface 34, and thus the angle of light projection.

The inclination angle a can be varied relative to the case 12 by rotating both disks/cam elements 84, 86 around the axis 101 so that relative movement therebetween effects the desired attitude adjustment for the mounting base 24 and case 12 thereon.

With the mounting bolt 92 directed through the bores 100, 106, the disks/cam elements 84, 86 can be rotated together relative to the mounting base 24 and case 12 and to each other.

Figure 17:
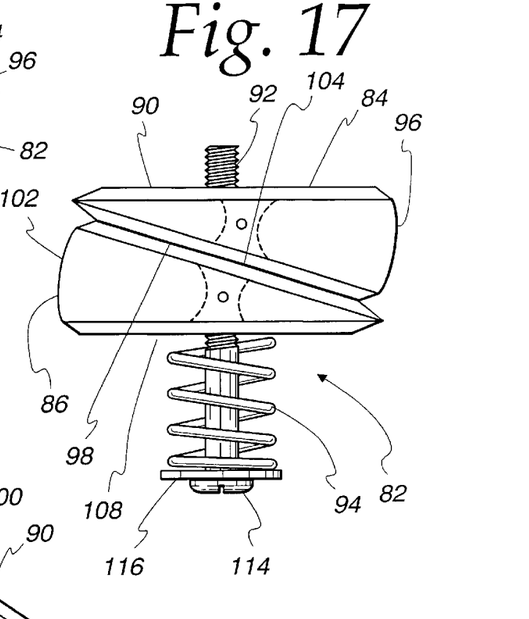
FIG. 17 is a side elevation view of the attitude adjusting subassembly of FIGS. 1 and 13–16, including in addition to the disk/cam elements a mounting bolt and spring element that is captive between the mounting bolt and disk/cam elements.
Figure 18:
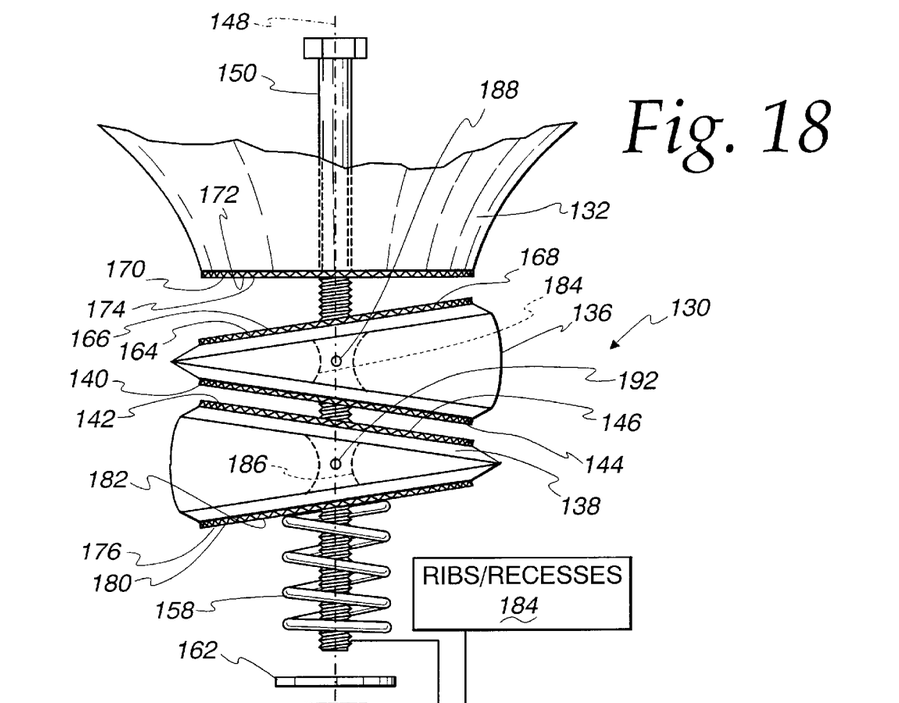
FIG. 18 is an exploded, elevation view of a modified form of attitude adjusting subassembly, according to the present invention, in relationship to a mounting base for supporting a light case, including cooperating disk/cam elements.

As previously described, a spring 94, that may be a coil spring as shown in FIG. 17, or other suitable structure, may be interposed captively between the disks/cam elements 84, 86, and an enlarged head 114 on the mounting bolt 92. In this case, a washer 116 is provided under the head 114.

Figure 16:
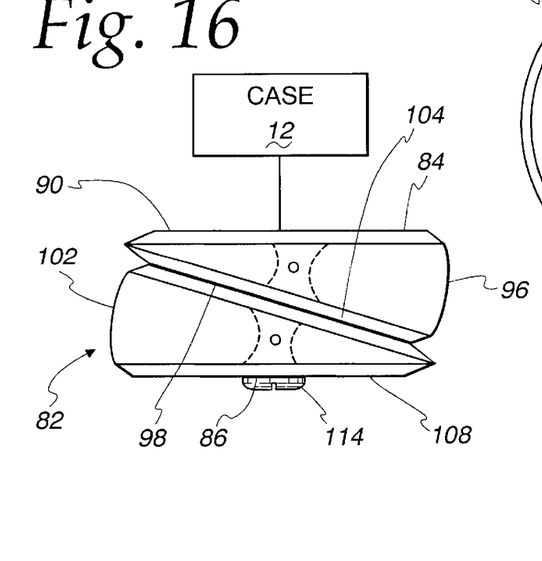
FIG. 16 is a side elevation view of the disk/cam elements in the FIG. 13 position and operatively connected to a case on the modular lighting unit, with the case shown in schematic form.

By directing the mounting bolt 92 into the mounting base 24 with the attitude adjusting subassembly 82 in the FIG. 17 configuration, the spring 94 can be compressed to apply a force that urges the cam surfaces 98, 104 against each other with the mounting bolt 92 in the loosened side of FIG. 17 to maintain a desired relative position preparatory to tightening the mounting bolt 92 to the tightened side of FIG. 16. Thus a preliminary adjustment can be made and then fixed by tightening the mounting bolt 92.

With a slight pressure applied through the spring 94, the surfaces 98, 104 can be slid guidingly one against the other, to select a desired relative position between the disks/cam elements 84, 86.

It should be understood that other configurations for the spring 94 could be utilized. Virtually any structure that would produce a resilient bias force on the disks/cam elements 84, 86 would be appropriate.

It is also possible to attach the attitude adjusting assembly 82 directly to the case 12, shown schematically at FIG. 16. This obviates the need for the mounting base 24.

Figures 1, 2:
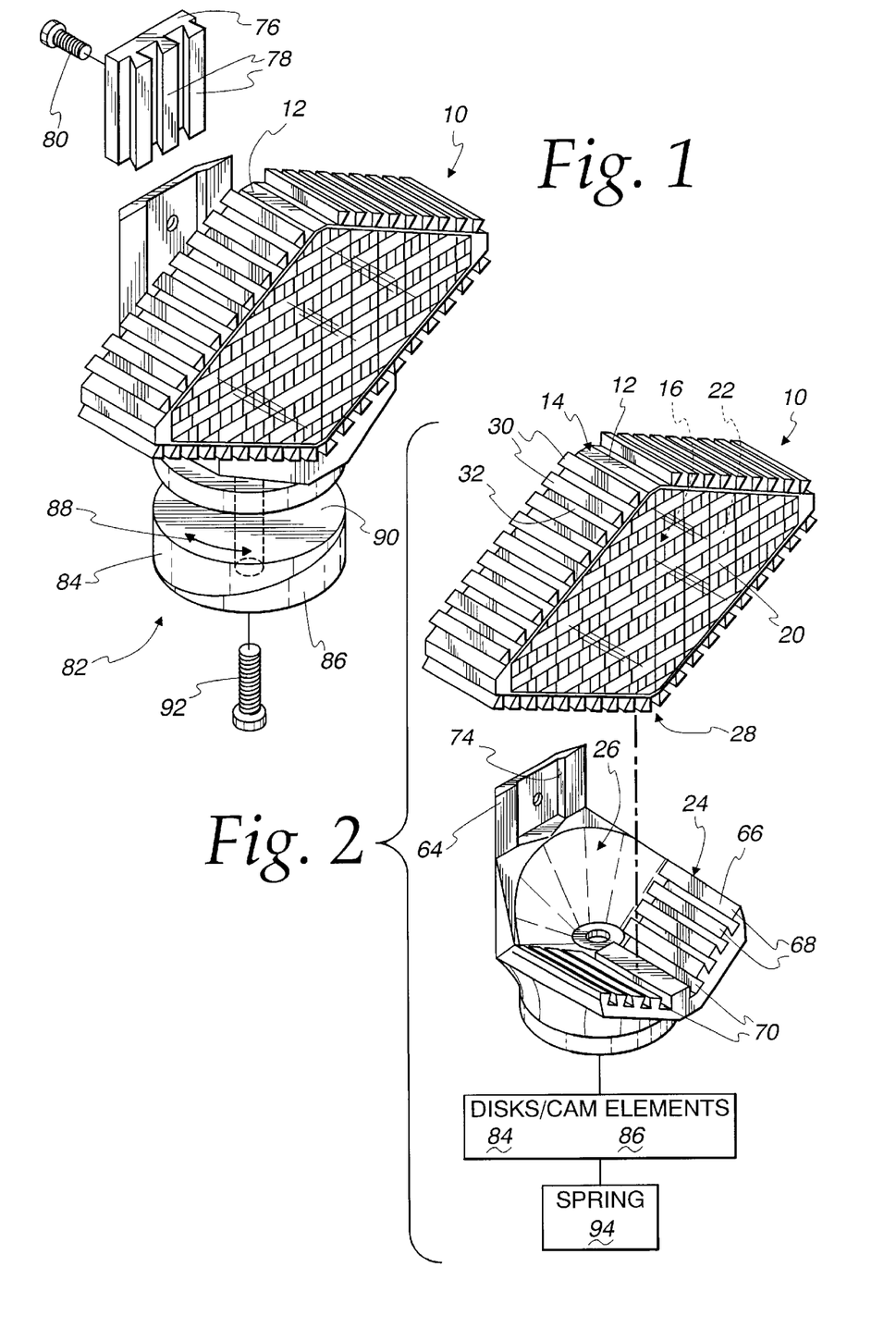
FIG. 1 is a perspective view of a modular lighting unit according to the present invention assembled to a mounting base and an attitude adjusting subassembly including cooperating disk/cam elements.
FIG. 2 is an exploded perspective view of the modular lighting unit and mounting base with the attitude adjusting subassembly shown in schematic form.
Figures 3, 4, 5:
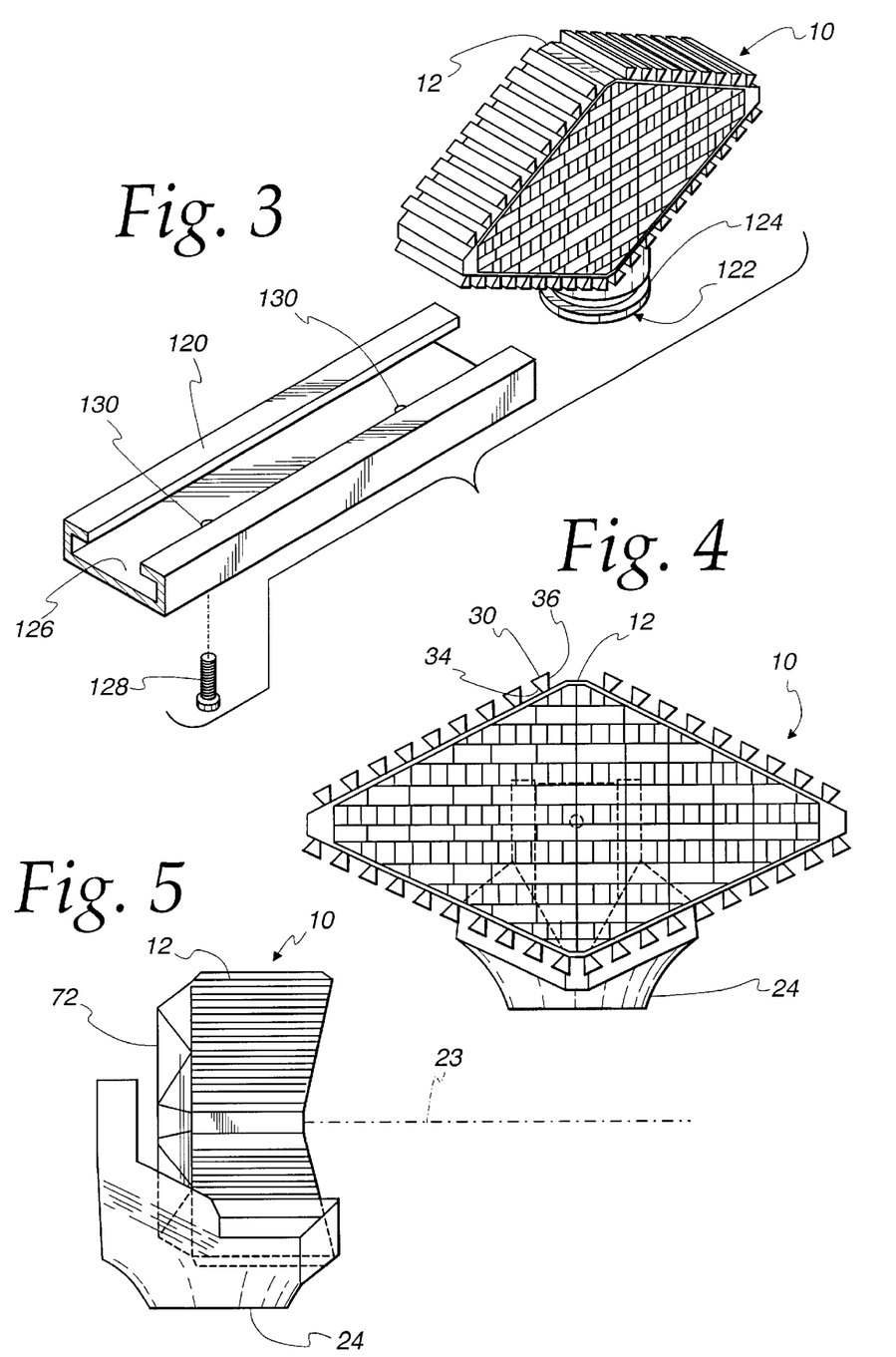
FIG. 3 is a perspective view of the modular lighting unit on the mounting base situated for engagement with a guide rail to which the lighting unit can be attached in a plurality of different positions.
FIG. 4 is a front elevation view of the modular lighting unit assembled to the mounting base.
FIG. 5 is a side elevation view of the modular lighting unit.

Another aspect of the invention is the provision of a mounting/guide rail 120 to accept a modified form of mounting base, as shown in FIG. 3 at 122. The mounting base 122 has an enlarged disk 124 which fits in a slot 126 on the rail 120 to allow the disk 124, and module 10 associated therewith, to be slid along the rail 120. A bolt 128 can be directed through any of a number of bores 130 in the rail 120 to extend into the mounting base 122 to fix the position of the mounting base 122 relative to the rail 120 as desired.

Another preferred form of the invention is shown in FIGS. 18–24. In these Figures, an adjusting subassembly is shown at 130 corresponding to the adjusting subassembly 82, previously described. The adjusting subassembly 130 cooperates with a mounting base 132, corresponding to the mounting base 24, described above.

The mounting subassembly 130 is similar in construction to the mounting subassembly 82, and consists of first and second disks/cam elements 136, 138, having the same general configuration as the disks/cam elements 84, 86, and functioning in substantially the same manner.

The principal difference between the disks/cam elements 136,138 and the disks/cam elements 84, 86, previously described, is that provision is made to key the disks/cam elements 136, 138 to each other to thereby more positively maintain the disks/cam elements 136, 138 in a desired relative position.

To accomplish this keying function, cooperating, flat surfaces 140, 142 on the disks/cam elements 136,138 are provided with keying elements in the form of elongate ribs 144, 146 on the disks/cam elements 136, 138, respectively.

Figure 19:
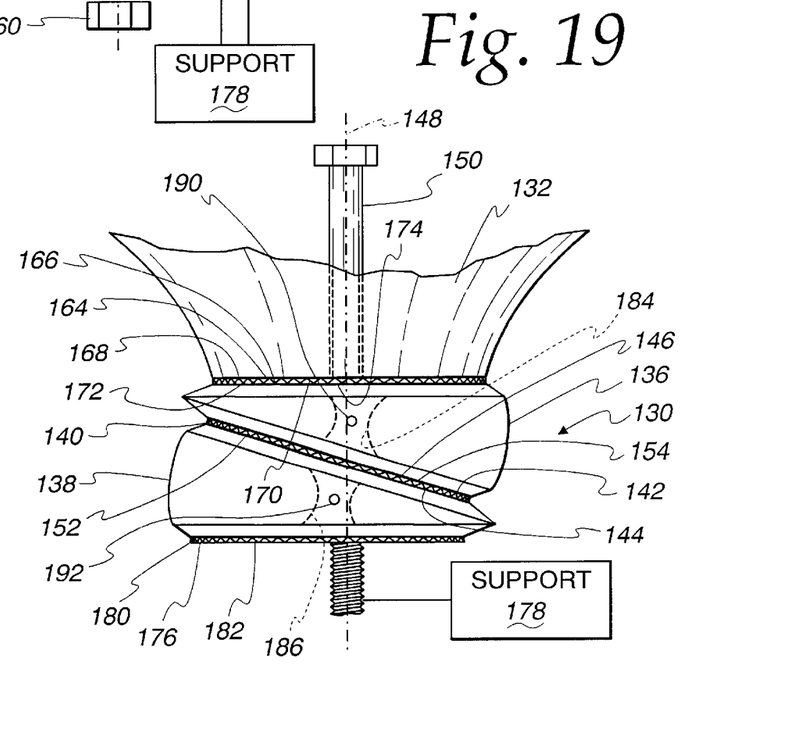
FIG. 19 is a view as in FIG. 18 with the mounting base and disk/cam elements in an operative position and with the disk/cam elements in a first relative position.
Figure 20:
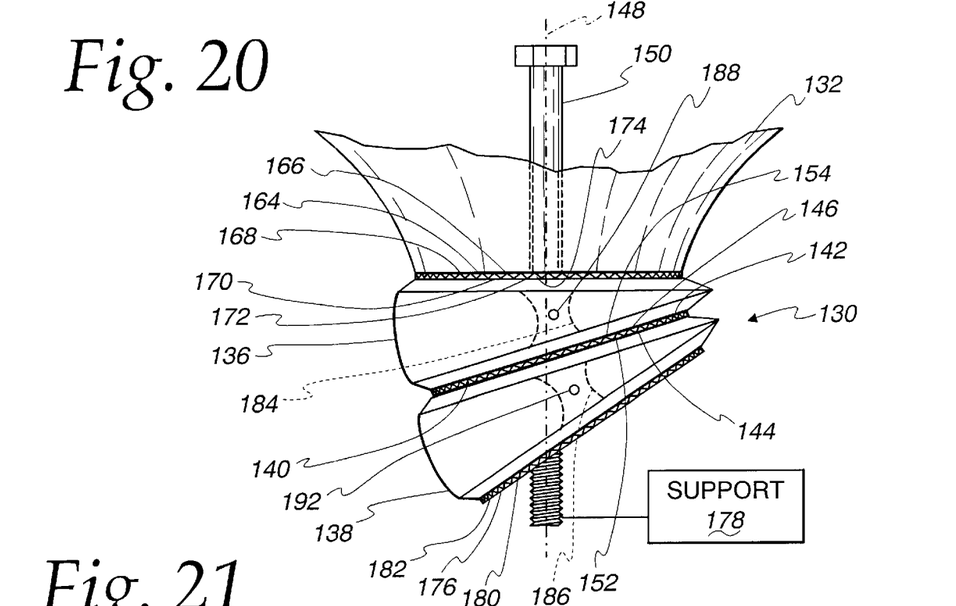
FIG. 20 is a view as in FIG. 19 with the disk/cam elements in a second relative position.
Figures 21, 22:
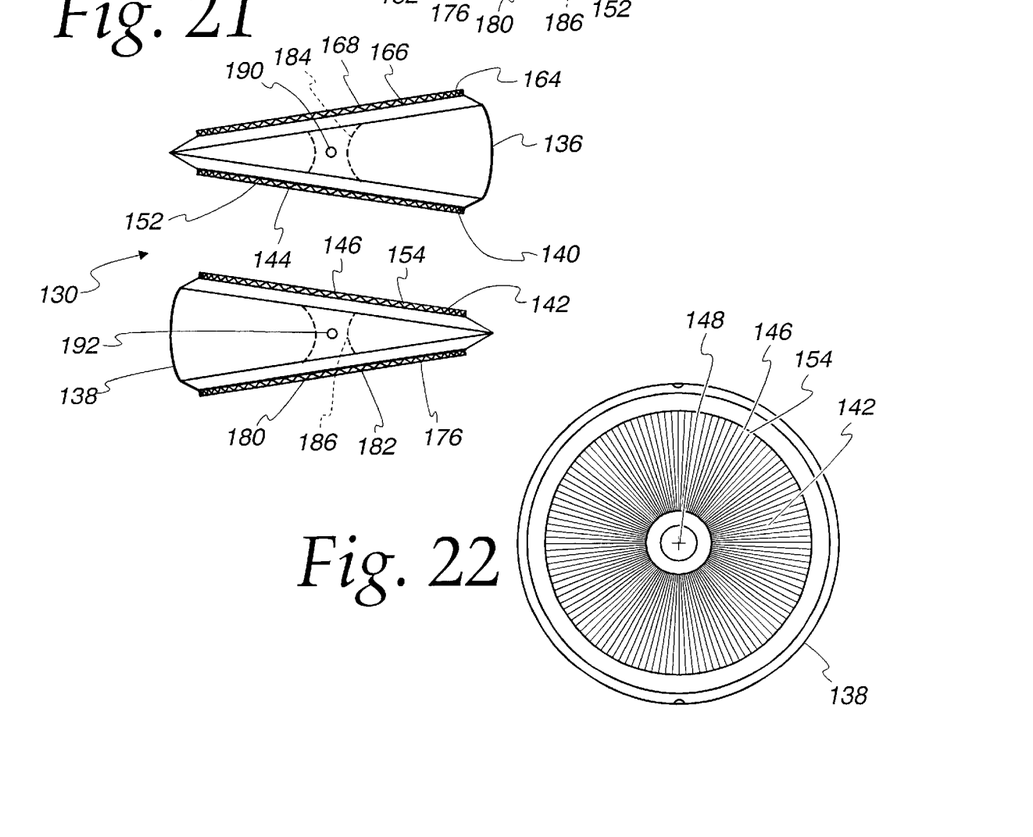
FIG. 21 is an exploded, elevation view of the disk/cam elements in a relative position as in FIG. 19.
FIG. 22 is a plan view of the lower disk/cam element of FIGS. 18–21.

The lengths of the ribs 144 on the disk/cam element 136 project in a radial direction with respect to the axis 148 defined by the mounting bolt 150, about which the disks/cam elements 136, 138 are relatively repositionable between a first relative position, shown in FIG. 19, and a second relative position, shown in FIG. 20. The ribs 144 are provided at regular intervals, continuously around the axis 148. Between adjacent ribs 144, recesses 152 are defined. The surface 142 on the disk/cam element 138 has a similar configuration with alternating, radially projecting ribs 146 and recesses 154.

As the disks/cam elements 136, 138 are rotated relative to each other around the axis 148, the flat surfaces 140, 142 defined by the ribs 144, 146 slide, one against the other. As this occurs, each rib 144 repetitively, and alternatingly, moves against the ribs 146 and into the recesses 154 between adjacent ribs 146. The ribs 146 move repetitively and alternatingly against the ribs 144 and into the recesses adjacent ribs 144. The disks/cam elements 136, 138 are fixed in a desired relative position with the ribs 144 nested in the recesses 154 and the ribs 146 nested in the recesses 152. With the bolt 150 tightened to draw the surfaces 140, 142 against each other, the meshing interaction between the ribs 144, 146 and recesses 152, 154 positively keys the disks/cam elements 136, 138 against relative rotation around the axis 148.

The ribs 144, 146 and recesses 152, 154 are configured to be complementary in shape and location to allow keying of the disks/cam elements 136, 138 in a multitude of different positions. The number of positions is dictated by the number of ribs 144,146 and recesses 152,154.

A coil spring 158 can be used to facilitate relative positioning of the disks/cam elements 136, 138. By tightening a nut 160 onto the mounting bolt 150, an intermediate washer 162 can be drawn against the coil spring 158, thereby compressing it and thereby producing a biasing force that urges the disk/cam element 138 against the disk/cam element 136, and in turn the disk/cam element 136 against the mounting base 132. The nut 160 can be tightened to the point that the flat surfaces 140, 142 on the disks/cam elements 136, 138 are urged against each other with only a slight bias force, thereby allowing the disks/cam elements 136, 138 to be relatively rotated around the axis 148. With this arrangement, the ribs 144, 146 cooperate to produce a ratchet-type action on the disks/cam elements 136, 138 are rotatingly slid, each against the other. Once the desired relationship between the disks/cam elements 136, 138 is established, the nut 160 can be firmly tightened to maintain the desired relationship.

In one preferred form, a similar arrangement of radially projecting ribs 164 and recesses 166 defines the upper surface 168 of the disk/cam element 136. The surface 168 cooperates with a downwardly facing, substantially flat surface 170 on the mounting base 132. The flat surface 170 on the mounting base 132 has an arrangement of radially extending ribs 172 and recesses 174. The ribs 164, 172 cooperate with each other and the recesses 166, 174 to allow the disk/cam element 136 to be selectively rotatably repositioned relative to the mounting base 132 around the axis 148 and fixedly keyed together in a desired angular relationship.

By preloading the disks/cam elements 136, 138 against the mounting base 132 using the spring 158, a ratchet action can be produced between the surfaces 168, 170. Thus, the assembler can controllably select the desired angular relationship between the disk/cam element 136 and the mounting base 132 and the disks/cam elements 136, 138. Once the desired relationship is selected and preliminarily maintained by the cooperating rib and recess arrangement, the nut 160 can be secured to fix this relationship.

Optionally, a like structural connection can be made between the bottom surface 176 on the disk/cam element 138 and a support 178 for the adjusting subassembly 130 and mounting base 132. That is, the surface 176 can be defined by radially projecting ribs 180 and recesses 182 which cooperate with an arrangement of ribs/recesses shown schematically at 184 on the support 178.

To accommodate the range of relative movement of the disks/cam elements 136, 138, the disk/cam element 136 is provided with an hourglass-shape through bore 184 with the disk/cam element 138 having a similarly configured through bore 186. This bore arrangement allows the mounting bolt 150 to move within the disks/cam elements 136, 138 without interference through the full range of movement between the positions shown in FIGS. 19 and 20.

The disks/cam elements 136, 138 can be configured differently or, more preferably, they have an identical construction. This latter construction avoids the expense of manufacturing and inventorying two different parts.

The disk/cam element 136 has a mark/dimple 188 and a diametrically oppositely located mark/dimple 190. The disk/cam element 138 has a mark/dimple 192 and a diametrically oppositely located mark/dimple (not shown). The marks/dimples 188, 190, 192 allow the user to visually identify the relative positions of the disks/cam elements 136, 138.

Figures 23, 24, 25:
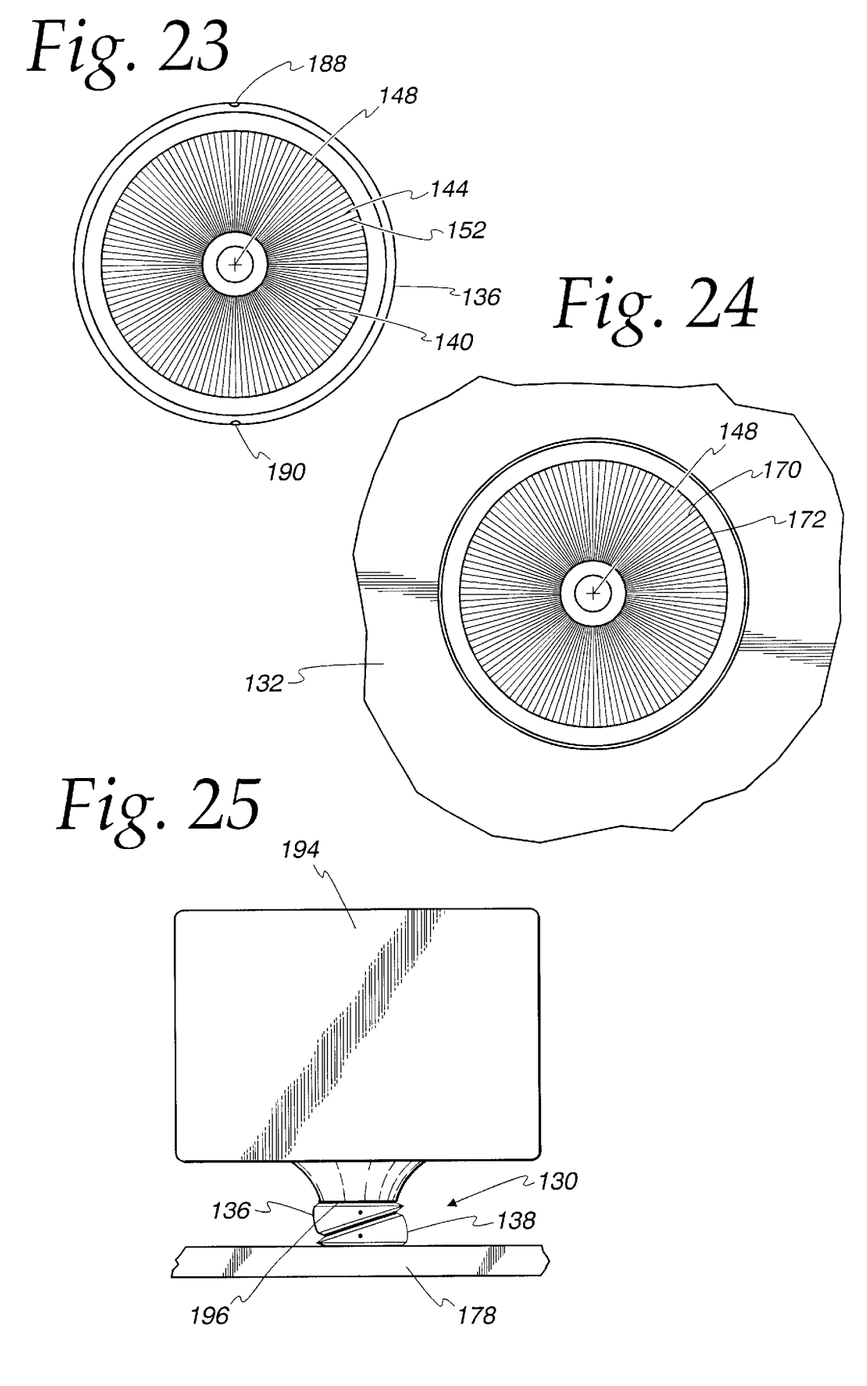
FIG. 23 is a bottom view of the upper disk/cam element in FIGS. 18–21 which cooperates with the disk/cam element in FIG. 22.
FIG. 24 is a bottom view of the mounting base which cooperates with the upper disk/cam element in FIGS. 18–21 and 23.
FIG. 25 is a schematic, elevation view of the disk/cam elements in FIGS. 18–23 operatively connected between a light case and support and directly connected to the light case.

In FIG. 25, the adjusting subassembly 130, consisting of the disk/cam element 136 and the disk/cam element 138 is shown operatively connected directly to a light case 194. This obviates the need for the intermediate mounting base 132, the bottom surface 196 of the case 194 may have the same arrangement of ribs and recesses as does the surface 170 on the mounting base 132. The adjusting subassembly 130 otherwise cooperates in the same manner as previously described with respect to FIGS. 18–24, between the case 194 and support 178.

The inventive concept can be practiced in other than a lighting environment. The invention can be practiced in virtually any environment wherein angular adjustment of one element relative to another is required.

While the disks/cam elements 136, 138 are shown as separate elements, structure for performing the functions of one or both of these elements can be integrally formed with the case 12, mounting base 24, 132 and support 178.

Cam surfaces are arranged in a spatially distinctive configuration, allowing for both pitch and roll for the cooperating elements, which allows for alteration in varying and multiple degrees to both horizontal and vertical planes, enabling a precision change in direction of the light source and/or light sources. Using multiple elements allows for a more radical adjustment of the light source(s). Using this type of cam adjustment, mounted to a rigid surface, makes possible positive setting of the focal point of the light source and positive stabilization and alignment of the light source (s) in a desired position.

The foregoing disclosure of specific embodiments is intended to be illustrative of the broad concepts comprehended by the invention.

What is claimed is:

1. In combination:

a case having a wall defining a light chamber; and an adjusting subassembly for the case for connection between the case and a surface upon which the case is supported, the adjusting subassembly comprising a first cam element with a first cam surface and a second cam element with a second cam surface, the first and second cam surfaces being abuttable to each other and slidable one against the other so that the first and second cam elements are thereby relatively movable between first and second relative positions, the first and second cam elements in the first relative position causing the case to be in a first attitude relative to a surface upon which the case is supported, the first and second cam elements in the second relative position causing the case to be in a second attitude relative to a surface upon which the case is supported.

2. The combination according to claim 1 further comprising a mounting base on the case and the adjusting subassembly acts between the mounting base and a surface upon which the case is supported.

3. The combination according to claim 1 wherein the first cam surface is substantially flat and resides substantially within a single plane.

4. The combination according to claim 3 wherein the second cam surface is substantially flat and resides substantially within a single plane.

5. The combination according to claim 1 in combination with a spring acting between the adjusting subassembly and a surface upon which the case is supported that develops a force that urges the first and second cam surfaces against each other.

6. The combination according to claim 1 further comprising a mounting element for mounting the adjusting subassembly on the case.

7. The combination according to claim 6 wherein the mounting element comprises a bolt that extends through both of the first and second cam elements.

8. The combination according to claim 7 wherein the bolt has a lengthwise axis and the first and second cam elements are movable between the first and second relative positions by rotation of at least one of the first and second cam elements relative to the other of the first and second cam elements around the lengthwise axis of the bolt.

9. The combination according to claim 8 wherein the bolt is repositionable between a loosened state and a tightened state and in the tightened state the bolt draws the first and second cam element surfaces against each other to thereby maintain the first and second cam elements in a desired relative position.

10. The combination according to claim 1 wherein the first and second cam elements are pivotable relative to each other and the case around an axis between the first and second relative positions.

11. The combination according to claim 1 wherein each of the first and second cam elements has an annular outer surface.

12. The combination according to claim 1 further comprising a light source on the case for projecting light from the light chamber.

13. The combination according to claim 12 further comprising a lens on the case through which light from the light source projects.

14. The combination according to claim 13 further comprising a reflector for redirecting light from the light source for projection through the lens.

15. The combination according to claim 2 wherein the base is releasably attachable to the case.

16. The combination according to claim 1 wherein there is a first keying element on the first cam surface and a second keying element on the second cam surface, the first and second keying elements abutting to each other to limit sliding movement of the first and second cam surfaces against each other.

17. The combination according to claim 16 wherein the first and second cam elements are movable between the first and second relative positions by relative rotation of the first and second cam elements around an axis, and the first keying element comprises an elongate rib having a length extending radially with respect to the axis.

18. The combination according to claim 1 wherein the first and second cam elements are movable between the first and second relative positions by relative rotation of the first and second cam elements around an axis, there is an elongate rib on the first cam surface having a length extending radially with respect to the axis, there are a plurality of elongate ribs on the second cam surface each extending radially with respect to the axis with a recess between adjacent ribs on the second cam surface, the rib on the first cam surface resides in a first recess between two ribs on the second cam surface with the first and second cam elements in the first relative position, and the rib on the first cam surface resides in a second recess between two ribs on the second cam surface with the first and second cam elements in the second relative position.

19. The combination according to claim 18 wherein the first rib resides in a third recess between two ribs on the second cam surface with the first and second cam elements in a third relative position.

20. The combination according to claim 1 wherein the first cam element has a third surface, the case has a fourth surface which abuts to the third surface, the third and fourth surfaces are slidable one against the other to allow the first cam element to be repositioned relative to the case, and there is a first keying element on the third surface and a second keying element on the fourth surface, the first and second keying elements abutting each other to limit repositioning of the first cam element relative to the case.

21. The combination according to claim 20 wherein the case and first cam element are guided in movement relative to each other around an axis, and at least one of the first and second keying elements comprises an elongate rib having a length extending radially with respect to the axis.

22. The combination according to claim 21 wherein the other of the first and second keying elements comprises an elongate rib having a length extending radially with respect to the axis.

23. The combination according to claim 2 wherein the first cam element has a third surface, the mounting base has a fourth surface which abuts to the third surface, the third and fourth surfaces are slidable one against the other to allow the first cam element to reposition relative to the mounting base, and there is a first keying element on the third surface and a second keying element on the fourth surface, the first and second keying elements abutting each other to limit repositioning of the first cam element relative to the mounting base.

24. The combination according to claim 23 wherein the mounting base and first cam element are guided in movement relative to each other around an axis, and one of the first and second keying elements comprises an elongate rib having a length extending radially with respect to the axis.

25. The combination according to claim 24 wherein the other of the first and second keying element comprises en elongate rib having a length extending radially with respect to the axis.

26. An attitude adjusting subassembly for a lighting unit having a case, the adjusting subassembly comprising:
   a first cam element with a first cam surface and a second cam element with a second cam surface,
   the first and second cam surfaces being abuttable to each other and slidable one against the other so that the first and second cam elements are thereby relatively movable between first and second relative positions,
   the first and second cam elements in the first relative position causing the case to be in a first attitude relative to a surface upon which the case is supported,
   the first and second cam elements in the second relative position causing the case to be in a second attitude relative to a surface upon which the case is supported.

27. The attitude adjusting assembly according to claim 26 wherein the first cam surface is substantially flat and resides substantially within a single plane.

28. The attitude adjusting assembly according to claim 27 wherein the second cam surface is substantially flat and resides substantially within a single plane.

29. The attitude adjusting assembly according to claim 28 further comprising a spring acting between the adjusting subassembly and a surface upon which the case is supported that develops a force that urges the first and second cam surfaces against each other.

30. The attitude adjusting assembly according to claim 29 further comprising a mounting bolt that is extended through the first and second cam elements, the mounting bolt having an axis, the first and second cam elements being rotatable relative to each other and the mounting bolt around the mounting bolt axis.

31. The attitude adjusting assembly according to claim 28 wherein the first cam surface comprises a first keying element and the second cam surface comprises a second keying element, the first and second keying elements abutting to each other to limit sliding movement of the first cam surface relative to the second cam surface.

32. The attitude adjusting assembly according to claim 31 wherein the first and second cam elements are movable between the first and second relative positions by relative rotation of the first and second cam elements around an axis, and the first keying element comprises an elongate rib having a length extending radially with respect to the axis.

33. The attitude adjusting assembly according to claim 28 wherein the first and second cam elements are movable between the first and second relative positions by relative rotation of the first and second cam elements around an axis, there is an elongate rib on the first cam surface having a length extending radially with respect to the axis, there are a plurality of elongate ribs on the second cam surface each extending radially with respect to the axis with a recess between adjacent ribs on the second cam surface, the rib on the first cam surface resides in a first recess between two ribs on the second cam surface with the first and second cam elements in the first relative position, and the rib on the first cam surface resides in a second recess between two ribs on the second cam surface with the first and second cam elements in the second relative position.

34. The attitude adjusting assembly according to claim 33 wherein the first rib resides in a third recess between two ribs on the second cam surface with the first and second cam elements in a third relative position.

35. An attitude adjusting subassembly for a first element, the adjusting subassembly comprising:

a first cam element with a first cam surface and a second cam element with a second cam surface, the first and second cam surfaces being abuttable to each other and slidable one against the other so that the first and second cam elements are thereby relatively movable between first and second relative positions, the first and second cam elements in the first relative position causing the first element to be in a first attitude relative to a surface upon which the first element is supported, the first and second cam elements in the second relative position causing the case to be in a second attitude relative to a surface upon which the case is supported.

* * * * *